United States Patent
Fu et al.

(10) Patent No.: US 12,487,135 B1
(45) Date of Patent: Dec. 2, 2025

(54) FLEXIBLE THIN FILMS PRESSURE SENSORS APPLICABLE IN HYPERGRAVITY CENTRIFUGAL ENVIRONMENTS

(71) Applicant: ZHEJIANG UNIVERSITY, Zhejiang (CN)

(72) Inventors: Haoran Fu, Hangzhou (CN); Guanwen Liang, Hangzhou (CN); Chengpeng Hong, Hangzhou (CN); Ying Wu, Hangzhou (CN); Zhehui Zhao, Hangzhou (CN); Zizhuang Yan, Hangzhou (CN); Bingjing Qiu, Hangzhou (CN); Chengbin Liu, Hangzhou (CN); Xuecheng Bian, Hangzhou (CN); Xia Tu, Hangzhou (CN); Yiting Lu, Hangzhou (CN); Daosheng Ling, Hangzhou (CN); Jianqun Jiang, Hangzhou (CN); Yunmin Chen, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 0 days.

(21) Appl. No.: 18/951,607

(22) Filed: Nov. 18, 2024

(30) Foreign Application Priority Data

Aug. 1, 2024 (CN) .......................... 202411050708.8

(51) Int. Cl.
*G01L 1/16* (2006.01)
(52) U.S. Cl.
CPC ...................... *G01L 1/16* (2013.01)
(58) Field of Classification Search
CPC ........................................... G01L 1/16
See application file for complete search history.

(56) References Cited

U.S. PATENT DOCUMENTS 8,994,528 B2 * 3/2015 Celik-Butler ............. G01L 1/18
340/539.22
10,859,450 B2 * 12/2020 Oh ......................... G01L 1/2287
(Continued)

FOREIGN PATENT DOCUMENTS

CN 103332649 A 10/2013
CN 210154720 U * 3/2020
(Continued)

OTHER PUBLICATIONS

Notification to Grant Patent Right for Invention in Chinese Application No. 202411050708.8 mailed on May 13, 2025, 4 pages.
(Continued)

*Primary Examiner* — Octavia Hollington
(74) *Attorney, Agent, or Firm* — PORUS IP LLC

(57) ABSTRACT

Provided is a flexible thin film pressure sensor applicable in a hypergravity centrifugal environment, comprising a composite thin film, two metal electrodes, and a flexible composite encapsulation layer. The composite thin film includes a polyvinylidene fluoride (PVDF) matrix and a carbon nanowire filled within the PVDF matrix. The PVDF matrix includes a lower PVDF layer and an upper PVDF layer. The two metal electrodes are respectively fixed to two surfaces of the composite thin film and overlap with each other. A region of the composite thin film located between the two metal electrodes is a polarized region. The flexible composite encapsulation layer has a double-layer structure, wherein two layers of the double-layered flexible composite encapsulation layer are disposed on the two surfaces of the composite thin film, respectively, and edge portions of the flexible composite encapsulation layer extend beyond the composite thin film and are fixed to each other.

10 Claims, 7 Drawing Sheets

(56) References Cited

U.S. PATENT DOCUMENTS

| | | | | |
|---|---|---|---|---|
| 11,946,821 | B2* | 4/2024 | Bao | ........................ G01L 1/146 |
| 12,055,449 | B2* | 8/2024 | Tan | ........................... G01L 1/18 |
| 12,085,597 | B2* | 9/2024 | Dai | ....................... G01R 29/12 |
| 2017/0068359 | A1* | 3/2017 | Ahn | ..................... G06F 3/0446 |

FOREIGN PATENT DOCUMENTS

| | | | | | |
|---|---|---|---|---|---|
| CN | 112985470 | A | | 6/2021 | |
| CN | 113394335 | A | | 9/2021 | |
| CN | 116782743 | A | * | 9/2023 | |
| KR | 102094998 | B1 | | 3/2020 | |
| WO | 2020252833 | A1 | | 12/2020 | |
| WO | WO-2023009828 | A1 | * | 2/2023 | ............. A61B 5/743 |

OTHER PUBLICATIONS

First Office Action in Chinese Application No. 202411050708.8 mailed on Feb. 18, 2025, 10 pages.

* cited by examiner

200

| 210: Weighing PVDF powder, pouring the PVDF powder into a container, and adding an N-methylpyrrolidone (NMP) solvent for mixing to obtain a film-casting solution. |

↓

| 220: Placing a base plate into a bottom of a solution tank, pouring the film-casting solution onto the base plate, and allowing the film-casting solution to adhere uniformly to a top surface of the base plate; after placing the solution tank in a constant-temperature environment and allowing the solution tank to stand for a preset period, removing the solution tank and placing the solution tank on an evaporation table; allowing the film-casting solution to solidify on the base plate to form a PVDF thin film after standing at a room temperature for one or more hours; and removing the base plate along with the PVDF thin film on the base plate from the solution tank. |

↓

| 230: Laser-cutting the PVDF thin film solidified on the base plate, so that a PVDF block is formed on the base plate. |

↓

| 240: Straightening a carbon nanowire and placing the carbon nanowire on the PVDF block. |

↓

| 250: Placing the base plate including the carbon nanowire back into the solution tank, pouring a new film casting solution into the solution tank again, so that the new film casting solution covers the carbon nanowire and the PVDF block; after placing the solution tank into the constant-temperature environment to stand for the preset period, removing the solution tank and placing the solution tank on the evaporation table; after standing at the room temperature for the one or more hours, allowing the new film casting solution to solidify on the base plate to form a composite thin film. |

- 310 — Preparing and disposing a lower PDMS layer on a bottom surface of a GeSbTe film, the GeSbTe film and the lower PDMS layer having a same thickness.

- 320 — Performing a plurality of indentation processes on a top surface of the GeSbTe film, so that a plurality of grooves arranged in a grid-like pattern are formed on a bottom surface of the lower PDMS layer; and after a period of time, allowing the bottom surface of the lower PDMS layer to rebound back to a planar structure, and the GeSbTe film forms a double-layer structure.

- 330 — Obtaining a flexible composite encapsulation layer by fixing a layer of a silicon nitride film on the top surface of the GeSbTe film and fixing a layer of an upper PDMS layer on a top surface of the silicon nitride film.

FLEXIBLE THIN FILMS PRESSURE SENSORS APPLICABLE IN HYPERGRAVITY CENTRIFUGAL ENVIRONMENTS

CROSS-REFERENCE TO RELATED APPLICATIONS

This application claims priority to Chinese Patent Application No. 202411050708.8, filed on Aug. 1, 2024, the entire contents of which are incorporated herein by reference.

TECHNICAL FIELD

The present disclosure relates to the technical field of flexible thin film pressure sensors, and in particular, to a flexible thin film pressure sensor applicable in a hypergravity centrifugal environment.

BACKGROUND

Hypergravity increases the volumetric forces on materials and enhances the driving forces for relative motion between various media phases, making hypergravity centrifugal simulation experimental technology a revolutionary means for studying the interactions and evolution of multiphase media. Hypergravity technology, therefore, enables cross-disciplinary research on multiphase media such as rock masses, soil masses, geological bodies, alloy melts, biological tissues, and chemical materials. Conducting model tests under hypergravity fields enhances the ability to observe the motion processes of multiphase media on large spatial and temporal scales in normal gravity conditions, while also providing extreme physical conditions that accelerate the separation between different media phases. By means of high-speed rotation, hypergravity centrifuges generate an n-g-level hypergravity field within the experimental chamber, leveraging the effects of scaling ($n^1$), time contraction ($n^2$), and energy enhancement ($n^3$) to replicate large-scale engineering reliability via the construction of small-scale models.

Sensors, as a key source of data acquisition in hypergravity model experiments, are affected by the high-g hypergravity environment, which may cause deformation in the sensitive elements of the sensors, structural deformation in polymer bonding structures, or increased interactions among components, thereby impacting the force-electric response of the devices and leading to significant errors in sensor feedback. As a result, hypergravity model experiments may fail to accurately reflect the true state of multiphase media evolution. Sensor reading errors can result in deviations in measured physical quantities, and aerospace equipment in hypergravity environments may face critical safety risks, such as explosions, if sensor values are compromised.

Currently, most flexible thin film pressure sensors use polyvinylidene fluoride (PVDF) material to produce piezoelectric films. Following polarization or during use, PVDF films may experience stress relaxation (a process accelerated under hypergravity conditions), causing the sensitive elements to wrinkle, which in turn affects the sensitivity of flexible thin film pressure sensors. This may lead to significant sensitivity variation across different environments and, ultimately, a considerable decrease in the measurement accuracy of flexible thin film pressure sensors.

SUMMARY

One or more embodiments of the present disclosure provide a flexible thin film pressure sensor applicable in a hypergravity centrifugal environment, comprising: a composite thin film, two metal electrodes, and a flexible composite encapsulation layer. The composite thin film includes a polyvinylidene fluoride (PVDF) matrix and a carbon nanowire filled within the PVDF matrix. The PVDF matrix includes a lower PVDF layer and an upper PVDF layer. The two metal electrodes are respectively fixed to two surfaces of the composite thin film and overlap with each other, a region of the composite thin film located between the two metal electrodes is a polarized region. The flexible composite encapsulation layer has a double-layer structure, wherein two layers of the double-layered flexible composite encapsulation layer are disposed on the two surfaces of the composite thin film, respectively, and edge portions of the flexible composite encapsulation layer extend beyond the composite thin film and are fixed to each other. Each layer of the double-layered flexible composite encapsulation layer is formed by laminating an upper polydimethylsiloxane (PDMS) layer, a silicon nitride film, a germanium-antimony-tellurium (GeSbTe) film, and a lower PDMS layer from top to bottom. The GeSbTe film has a double-layer structure, wherein each of an upper GeSbTe film and a lower GeSbTe film of the double-layered GeSbTe film is composed of a plurality of GeSbTe blocks. The upper GeSbTe film and the lower GeSbTe film form into a grid-like crossed structure, wherein a region between any two adjacent GeSbTe blocks of the upper GeSbTe film completely overlaps with a GeSbTe block of the lower GeSbTe film, and the lower GeSbTe film extends and is wrapped into the lower PDMS layer, such that a region between any two adjacent GeSbTe blocks of the lower GeSbTe film is filled with PDMS, and the region between any two adjacent GeSbTe blocks of the upper GeSbTe film includes a hollow structure. In each layer of the double-layered flexible composite encapsulation layer, a bottom surface of the lower PDMS layer is disposed on one of the two surfaces of the composite thin film, and edge portions of the bottom surfaces of the lower PDMS layers of the two layers of the double-layered flexible composite encapsulation layer are fixed to each other.

BRIEF DESCRIPTION OF THE DRAWINGS

FIG. 2 is a flowchart illustrating an exemplary process of a method for preparing a composite thin film according to some embodiments of the present disclosure;

FIG. 3 is a flowchart illustrating an exemplary process of a method for preparing a flexible composite encapsulation layer according to some embodiments of the present disclosure;

Figure 1:
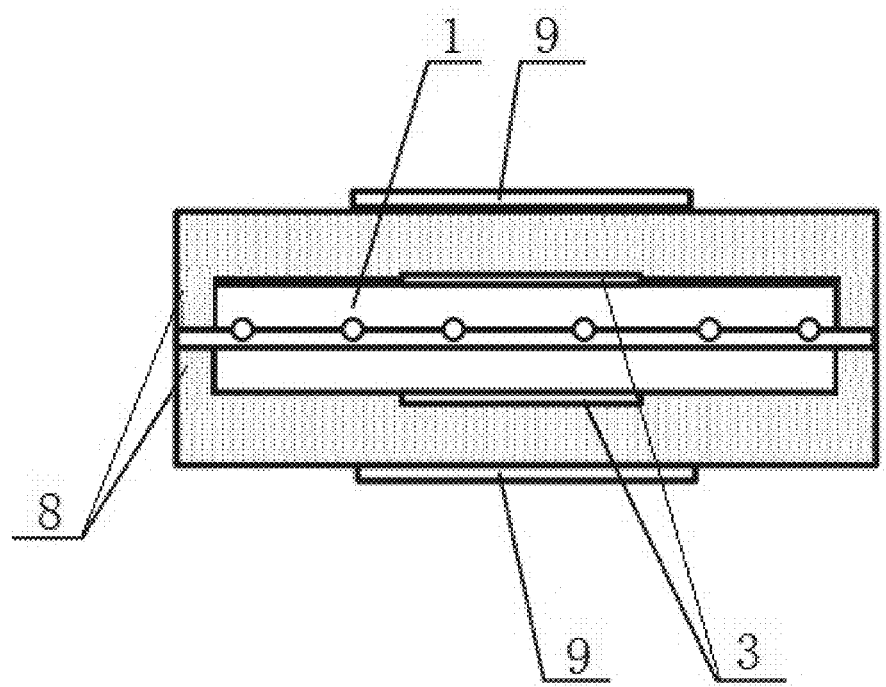
FIG. 1 is a cross-sectional view of a pressure sensor according to some embodiments of the present disclosure.

Numerals in the drawings: 1—composite thin film, 11—carbon nanowires, 12—lower polyvinylidene fluoride layer, 13—upper polyvinylidene fluoride layer, 14—polyvinylidene fluoride block, 2—base plate, 3—metal electrode, 4—polarizing indenter, 5—depolarizing indenter, 6—first electrode wire, 7—second electrode wire, 8—flexible composite encapsulation layer, 81—upper polydimethylsiloxane layer, 82—silicon nitride film, 83—upper germanium-antimony-tellurium film, 84—lower germanium-antimony-tellurium film, 85—lower polydimethylsiloxane layer, 9—metasurface media, 91—hydrophilic material, 92—superhydrophobic material, 01—sandy soil, 02—moisture, 03—bubble, 04—water medium.

DETAILED DESCRIPTION

The technical solutions in the embodiments of the present disclosure will be clearly and completely described below in conjunction with the accompanying drawings in the embodiments of the present disclosure, and it is clear that the embodiments described are only a portion of the embodiments of the present disclosure, and not all of the embodiments. Based on the embodiments in the present disclosure, all other embodiments obtained by a person of ordinary skill in the art without making creative labor fall within the scope of protection of the present disclosure.

As indicated in the present disclosure and in the claims, the singular forms "a," "an," and "the" may be intended to include the plural forms as well, unless the context clearly indicates otherwise. In general, the terms "comprise," "comprises," and/or "comprising," "include," "includes," and/or "including," when used in this disclosure, specify the presence of stated features, integers, steps, operations, elements, and/or components, but do not preclude the presence or addition of one or more other features, integers, steps, operations, elements, components, and/or groups thereof.

Flowcharts are used in the present disclosure to illustrate the operations performed by the system according to the embodiments described herein. It should be understood that the operations may not necessarily be performed in the exact sequence depicted. Instead, the operations may be performed in reverse order or concurrently. Additionally, other operations may be added to these processes, or one or more operations may be removed.

FIG. 1 is a cross-sectional view of a pressure sensor according to some embodiments of the present disclosure.

In some embodiments, as shown in FIG. 1, a flexible thin film pressure sensor applicable in a hypergravity centrifugal environment includes a composite thin film 1, two metal electrodes 3, and a flexible composite encapsulation layer 8.

The composite thin film 1 refers to a thin film in a sensor and is composed of a plurality of materials. The composite thin film may also be referred to as a polyvinylidene fluoride (PVDF) nanowire composite thin film.

In some embodiments, the composite thin film 1 includes a PVDF matrix and a carbon nanowire filled within the PVDF matrix.

The PVDF matrix refers to polyvinylidene fluoride that is used as a substrate to fix other materials. There are various ways of fixing, including, but not limited to, bonding, or the like.

Figure 5:
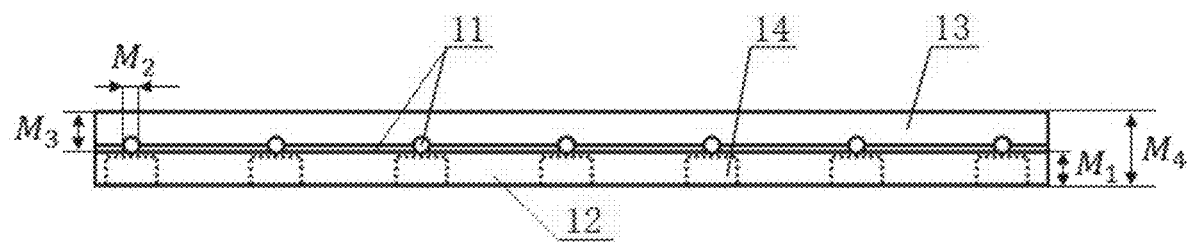
FIG. 5 is a cross-sectional view of a composite thin film according to some embodiments of the present disclosure.

FIG. 5 is a cross-sectional view of a composite thin film according to some embodiments of the present disclosure.

In some embodiments, the PVDF matrix includes a lower PVDF layer 12 and an upper PVDF layer 13, as shown in FIG. 5.

In some embodiments, the lower PVDF layer 12 and the upper PVDF layer 13 refer to the PVDF matrix disposed below and above a carbon nanowire 11, respectively.

In some embodiments, a ratio of a thickness of the lower PVDF layer to a thickness of the upper PVDF layer is within a first preset range. For example, the ratio of the thickness of the lower PVDF layer to the thickness of the upper PVDF layer ranges from 1 to 1.5. As another example, the ratio of the thickness of the lower PVDF layer to the thickness of the upper PVDF layer ranges from 1.1 to 1.3. As yet another example, the ratio of the thickness of the lower PVDF layer to the thickness of the upper PVDF layer ranges from 0.9 to 1.6. A size of the first preset range is preset according to actual requirements.

The carbon nanowire 11 refers to a carbon nanomaterial formed from carbon atoms. The carbon nanowire 11 has a diameter in a nanometer scale.

Figure 4:
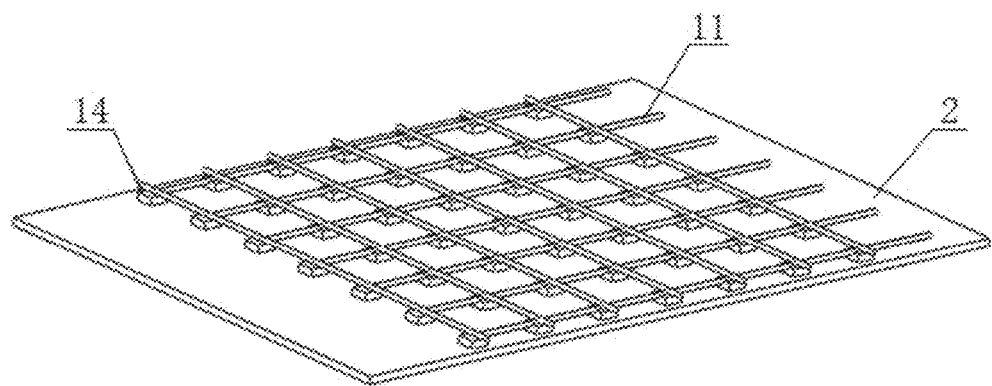
FIG. 4 is a schematic diagram illustrating a structure of a carbon nanowire affixed to a PVDF block according to some embodiments of the present disclosure.

FIG. 4 is a schematic diagram illustrating a structure of a carbon nanowire affixed to a PVDF block according to some embodiments of the present disclosure.

In some embodiments, a plurality of carbon nanowires 11 may be provided, as shown in FIG. 4. The plurality of carbon nanowires 11 form a grid-like pattern, and more details regarding this section may be found in other contents of the present disclosure (e.g., description in connection with FIG. 2). The count of the carbon nanowires 11 is preset based on actual requirements.

In some embodiments, the lower PVDF layer 12 is disposed directly below the carbon nanowires 11; and the upper PVDF layer 13 is filled within grids of the carbon nanowires 11 and is disposed directly above the carbon nanowires 11, as shown in FIG. 5.

In some embodiments of the present disclosure, the composite thin film compounded with the carbon nanowires is arranged in a grid pattern. The carbon nanowires are macroscopic assemblies consisting of carbon nanotubes, and the carbon nanowires have a strength greater than 8.8 Gpa and a tensile modulus greater than 300 Gpa. Therefore, by adding the carbon nanowires to the PVDF film, a strength of the PVDF film can be effectively improved, and the problem of residual stress release after polarization of the PVDF film can be effectively solved, which further improves a wrinkle-resistant ability of the PVDF film, and enhances measurement accuracy of the flexible thin film pressure sensor.

In some embodiments, a ratio of a diameter of the carbon nanowire 11 to a thickness of the PVDF matrix is within a second preset range. For example, the ratio of the diameter of the carbon nanowire 11 to the thickness of the PVDF matrix ranges from 0.1 to 0.15. As another example, the ratio of the diameter of the carbon nanowire 11 to the thickness of the PVDF matrix ranges from 0.11 to 0.13. As yet another example, the ratio of the diameter of the carbon nanowire 11 to the thickness of the PVDF matrix ranges from 0.08 to 0.16. A size of the second preset range is preset based on actual requirements.

In some embodiments of the present disclosure, by reasonably setting the ratio of the diameter of the carbon nanowire to the thickness of the PVDF matrix, and the ratio of the thicknesses of the lower PVDF layer to the thickness of the upper PVDF layer, the composite thin film ultimately obtained can meet requirements of the pressure sensor.

In some embodiments, the composite thin film 1 may be obtained in a plurality of ways. For example, the composite thin film 1 is obtained through operations including layer-by-layer self-assembly, ion-beam sputtering, thin film co-deposition, thermocompression, laser etching, electron-beam evaporation, or the like.

In some embodiments, the composite thin film 1 may be obtained through operations including preparing a film-casting solution, standing, evaporating, cutting, or the like, and more details regarding this section may be found in other contents of the present disclosure (e.g., description in connection with FIG. 2).

The metal electrodes 3 refer to electrodes made of metal or metal alloys, or the like. In some embodiments, a count of the metal electrodes is 2.

In some embodiments, as shown in FIG. 1, the two metal electrodes 3 are respectively fixed to two surfaces of the composite thin film 1 and overlap with each other, and a region of the composite thin film 1 located between the two metal electrodes is a polarized region.

In some embodiments, fixation of the two metal electrodes 3 to the composite thin film 1 may be achieved in a plurality of ways, for example, welding the two metal electrodes 3 to the composite thin film 1, or the like.

In some embodiments, the fixation of the metal electrodes 3 to the composite thin film 1 may also be achieved by plating a chromium film on the polarized region and sputtering a metal layer, and more details regarding this section may be found in other contents of the present disclosure (e.g., description in connection with FIG. 2).

The polarized region refers to a region of the composite thin film located between the two metal electrodes. In some embodiments, there is a deviation of an electrode potential from its equilibrium potential in the polarized region when there is a current passing through the electrodes.

In some embodiments, the metal electrodes may be obtained in a plurality of ways, for example, electrochemical deposition, or the like.

In some embodiments, the metal electrodes may be obtained by sputtering a metal layer on the chromium film, and more details regarding this section may be found in other contents of the present disclosure (e.g., description in connection with FIG. 2).

The flexible composite encapsulation layer 8 refers to a material layer configured to encapsulate the composite thin film and the metal electrodes.

In some embodiments, as shown in FIG. 1, the flexible composite encapsulation layer 8 has a double-layer structure, wherein the double-layered flexible composite encapsulation layer 8 is disposed on the two surfaces of the composite thin film 1, respectively, and edge portions of the flexible composite encapsulation layer 8 extend beyond the composite thin film 1 and are fixed to each other.

The double-layered flexible composite encapsulation layer 8 being disposed on the two surfaces of the composite thin film 1 respectively means that the flexible composite encapsulation layer 8 includes an upper portion and a lower portion for encapsulating the upper PVDF layer 13 and the lower PVDF layer 12 and their corresponding metal electrodes 3, respectively. A relative positional relationship between the flexible composite encapsulation layer 8 and the composite thin film 1 may be achieved in multiple ways, including, but not limited to, bonding, or the like.

In some embodiments, as shown in FIG. 1, the edge portions of the flexible composite encapsulation layer 8 extend beyond the composite thin film 1 and being fixed to each other means that the edge portions on the left side of the flexible composite encapsulation layer 8 and the edge portions on the right side of the flexible composite encapsulation layer 8 have a same length as the carbon nanowire 11 in the composite thin film 1 and longer than the PVDF matrix. Parts of the edge portions on the left and right sides, which extend beyond the composite thin film 1, are fixed to each other, thereby eliminating a need to fit to a shape of the composite thin film 1, ensuring that the composite thin film 1 is completely encapsulated in the double-layered flexible composite encapsulation layer 8. The edge portions of the flexible composite encapsulation layer 8 may be fixed to each through a plurality of ways, including, but not limited to, bonding, or the like.

Figure 8:
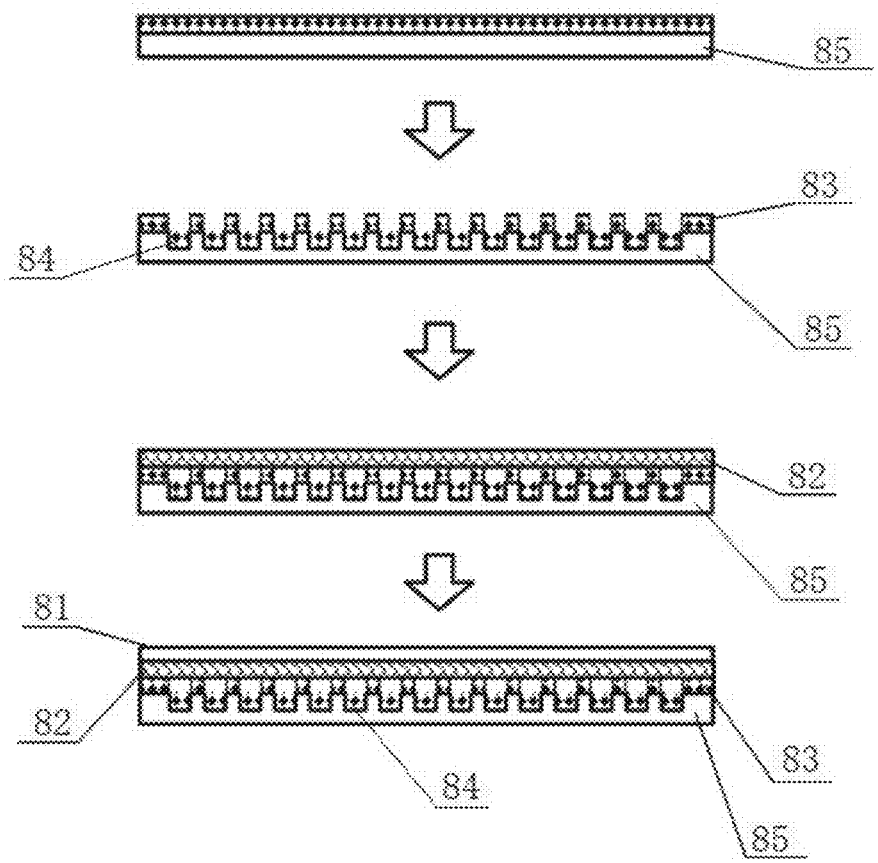
FIG. 8 is a flowchart illustrating an exemplary process for preparing a flexible composite encapsulation layer according to some embodiments of the present disclosure.

FIG. 8 is a flowchart illustrating an exemplary process for preparing a flexible composite encapsulation layer according to some embodiments of the present disclosure.

In some embodiments, each layer of the double-layered flexible composite encapsulation layers 8 is formed by laminating an upper polydimethylsiloxane (PDMS) layer 81, a silicon nitride film 82, a germanium-antimony-tellurium (GeSbTe) film, and a lower PDMS layer 85 from top to bottom, as shown in FIG. 8.

Polydimethylsiloxane is a polymer with the chemical formula $(C_2H_6OSi)_n$. The upper PDMS layer 81 and the lower PDMS layer 85 refer to two material layers, from top to bottom in the flexible composite encapsulation layer 8, that are made of polydimethylsiloxanes.

The silicon nitride film 82 refers to a material layer made of silicon nitride.

The GeSbTe film refers to a film composed of elements germanium, antimony, and tellurium.

In some embodiments, as shown in FIG. 8, the GeSbTe film has a double-layer structure, wherein each of an upper GeSbTe film 83 and a lower GeSbTe film 84 of the double-layered GeSbTe film is composed of a plurality of GeSbTe blocks; and the upper GeSbTe film 83 and the lower GeSbTe film 84 form into a grid-like crossed structure.

The GeSbTe blocks refer to small film units composed of the elements germanium, antimony, and tellurium.

The grid-like cross structure means that each of the upper GeSbTe film 83 and the lower GeSbTe film 84 has a grid-like structure, but spaces between the upper GeSbTe film 83 and the lower GeSbTe film 84 are arranged in a staggered manner, i.e., a region between any two neighboring GeSbTe blocks of the upper GeSbTe film 83 is completely overlapped by a GeSbTe block of the lower GeSbTe film 84.

Completely overlapping means that the region between any two adjacent GeSbTe blocks of the upper GeSbTe film 83 corresponds to a GeSbTe block of the lower GeSbTe film 84.

In some embodiments, the lower GeSbTe film 84 extends and is wrapped into the lower PDMS layer 85, such that a region between any two adjacent GeSbTe blocks of the lower GeSbTe film 84 is filled with PDMS. The region between any two adjacent GeSbTe blocks of the upper GeSbTe film 83 includes a hollow structure.

The lower GeSbTe film 84 being wrapped into the lower PDMS layer 85 refers to that the lower PDMS layer 85 covers a surface of the lower GeSbTe film 84.

In some embodiments, a distance between any two adjacent GeSbTe blocks of the upper GeSbTe film is $L_5$; a distance between any two adjacent GeSbTe blocks of the lower GeSbTe film is $L_4$; a size of $L_4$ is positively correlated to a diameter of the metal electrode; and a size of $L_5$ is positively correlated to the size of $L_4$.

In some embodiments, the size of $L_4$ is positively correlated to the diameters of the two metal electrodes, i.e., the larger the diameters of the two metal electrodes, the larger $L_4$ is. In some embodiments, $L_4$ may be determined based on the diameter of the metal electrode by a preset equation. For example, $L_4$ is determined by Eq. (5). More details regarding Eq. (5) may be found in other contents of the present disclosure (e.g., the later description).

In some embodiments, the size of $L_5$ is positively correlated to the size of $L_4$, i.e., the larger $L_4$ is, the larger $L_5$ is. In some embodiments, $L_5$ may be determined based on $L_4$ by a preset equation. For example, $L_5$ is determined by Eq. (6). More details regarding Eq. (6) may be found in other contents of the present disclosure (e.g., the later description).

In some embodiments of the present disclosure, by reasonably setting the distance between any two adjacent GeSbTe blocks of the upper GeSbTe film and the distance between any two adjacent GeSbTe blocks of the lower GeSbTe film, it helps to realize overlapping between the GeSbTe blocks of the upper GeSbTe film and the GeSbTe blocks of the lower GeSbTe film. In addition, correlating the above-mentioned distances with the diameter of the metal electrode can make the size of the GeSbTe film more reasonable while enhancing the conductivity of the sensor.

In some embodiments, in each layer of the double-layered flexible composite encapsulation layer 8, a bottom surface of the lower PDMS layer 85 is disposed on one of the two surfaces of the composite thin film 1, and edge portions of the bottom surfaces of the lower PDMS layers 85 of the two layers of the double-layered flexible composite encapsulation layer 8 are fixed to each other.

In some embodiments, the bottom surface of the lower PDMS layer 85 may be disposed on the surface of the composite thin film 1 in multiple ways, including, but not limited to, bonding, or the like. Mutual fixation of the edge portions of the bottom surfaces of the lower PDMS layers 85 may be achieved in a plurality of ways, for example, bonding, welding, or the like.

In some embodiments, the flexible composite encapsulation layer 8 may be obtained in a plurality of ways, for example, obtained by techniques such as chemical plating, etc.

In some embodiments, the flexible composite encapsulation layer 8 may be obtained by sequentially fabricating each of the above-mentioned material layers separately, and more details regarding this section may be found in other contents of the present disclosure (e.g., description in connection with FIG. 3).

In some embodiments of the present disclosure, by adding the carbon nanowires to the composite thin film, the strength of the composite thin film can be effectively enhanced, the problem of residual stress release after polarization of the composite thin film can be effectively solved, thereby further enhancing the wrinkle-resistant ability of the composite thin film and improving the measurement accuracy of the pressure sensor.

The sensitivity of a sensor made of a PVDF material may be significantly affected by a temperature field, and when applied in hypergravity tests, the sensitivity of the sensor is affected in two ways. On one hand, high-speed rotation of a centrifuge causes a uniform increase in an internal environmental temperature of a centrifuge chamber. On the other hand, certain variables during the experiment may cause a sudden increase in environmental temperature; for example, in hypergravity explosion tests, the high temperatures generated at the moment of explosion may cause a drift in a sensor sensitivity coefficient.

In some embodiments of the present disclosure, the flexible composite encapsulation layer is formed by laminating the upper PDMS layer, the silicon nitride film, the GeSbTe film, and the lower PDMS layer, and the GeSbTe film includes the hollow structure. Due to a high thermal conductivity of the silicon nitride film, the silicon nitride film can absorb the internal temperature of a measuring medium and rapidly diffuse within the silicon nitride film, preventing localized heating. The hollow structure of the GeSbTe film may be used to store and impede certain thermal energy, while the extremely low thermal conductivity of the GeSbTe film prevents further heat transfer to the composite film. This ensures that the flexible composite encapsulation layer provides excellent thermal insulation, protecting the pressure sensor from the effects of the hypergravity centrifuge's operation and experiments involving significant temperature changes, thereby ensuring measurement sensitivity and accuracy.

In some embodiments, as shown in FIG. 1, two layers of metasurface media are fixed on two outer surfaces of the flexible composite encapsulation layer 8, respectively, and two metasurface media 9 are concentric with the polarized region of the composite thin film 1. The two metasurface media 9 cover the polarized region of the composite thin film 1 and overlap with each other.

In some embodiments, the two layers of metasurface media may be fixed on the two outer surfaces of the flexible composite encapsulation layer 8 in a plurality of ways, for example, bonding, welding, or the like.

The two metasurface media 9 are concentric with the polarized region of the composite thin film 1 means that the two metasurface media are symmetrically related to the polarization region of the composite film with respect to a same point.

The two metasurface media 9 cover the polarized region of the composite thin film 1 means that a coverage of the two metasurface media on the polarized region extends beyond the polarized region.

Overlapping with each other means that the two metasurface media are disposed exactly symmetrically on the outer surfaces of the flexible composite encapsulation layer.

In some embodiments, a diameter of each of the two metasurface media is $D_2$, a thickness of each of the two metasurface media is $M_5$, a size of the diameter $D_2$ of each of the two metasurface media is positively correlated with the diameter of the two metal electrode, and a size of the thicknesses $M_5$ of each of the two metasurface media is positively correlated with a thickness $M_4$ of the composite thin film.

In some embodiments, the size of the diameters $D_2$ of each of the two metasurface media is positively correlated with the diameter of each of the two metal electrodes, i.e., the greater the diameter of each of the metal electrodes, the greater the diameter $D_2$ of each of the two metasurface media. In some embodiments, the diameter of each of the two metasurface media $D_2$ may be determined based on the diameter of each of the two metal electrodes by a preset equation. For example, the diameter of each of the two metasurface media is determined by Eq. (7). More details regarding Eq. (7) may be found in other contents of the present disclosure (e.g., the later description).

In some embodiments, the size of the thicknesses $M_5$ of each of the two metasurface media is positively correlated with the thickness $M_4$ of the composite thin film, i.e., the greater the thickness $M_4$ of the composite thin film, the greater the thickness $M_5$ of each of the two metasurface media. In some embodiments, the thickness $M_3$ of each of the two metasurface media may be determined based on the thickness $M_4$ of the composite thin film by a preset equation. For example, the thickness $M_5$ of each of the two metasurface media is determined by Equation (8). More details regarding Eq. (8) may be found in other contents of the present disclosure (e.g., the later description).

In some embodiments of the present disclosure, by reasonably setting the diameter and the thickness of each of the two metasurface media, the two layers of metasurface media can be set more reasonably to satisfy needs of the pressure sensor.

Figure 10:
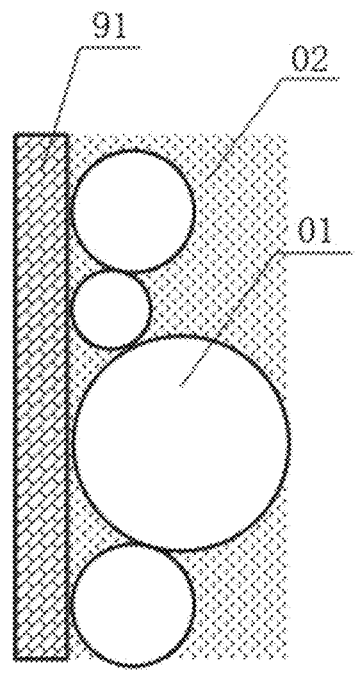
FIG. 10 is a schematic diagram illustrating sandy soil applying an impact load to a hydrophilic material according to some embodiments of the present disclosure.

FIG. 10 is a schematic diagram illustrating sandy soil applying an impact load to a hydrophilic material according to some embodiments of the present disclosure.

In some embodiments, when the pressure sensor is used in a discontinuous medium, each of the two metasurface media 9 is made of a hydrophilic material 91, as shown in FIG. 10.

The discontinuous medium refers to a substance that does not have a stable heat transfer coefficient and a stable thermal conductivity coefficient, such as sandy soil 01, or the like.

The hydrophilic material 91 refers to a material that is hydrophilic, for example, polyvinyl alcohol (PVA), or the like. Hydrophilic refers to the property of molecules with polar groups that have a high affinity for water, enabling them to attract water molecules or dissolve easily in water.

In some embodiments of the present disclosure, when the pressure sensor is used in the discontinuous medium, the two metasurface media are made of the hydrophilic material. This is because the hydrophilic material can adsorb moisture ($H_2O$) from the discontinuous medium (e.g., sandy soil) onto a surface of the metasurface layer, thereby making a load-bearing area more uniform when the pressure sensor is subjected to an impact load from the sandy soil, which in turn improves measurement accuracy.

Figure 11:
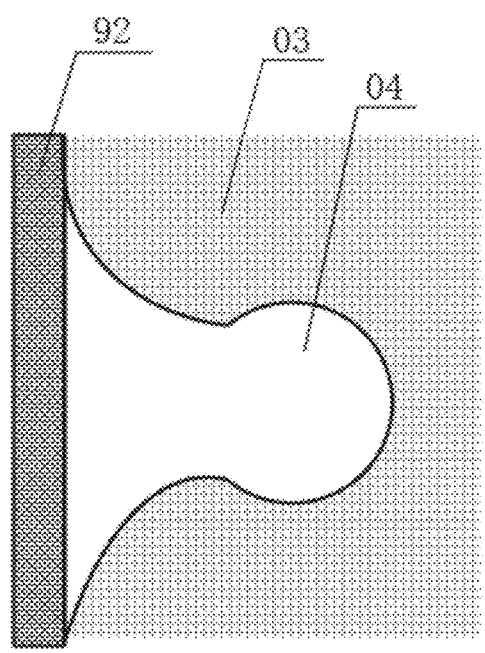
FIG. 11 is a schematic diagram illustrating an exploding bubble in water applying an impact load to a superhydrophobic material according to some embodiments of the present disclosure.

FIG. 11 is a schematic diagram illustrating an exploding bubble in water applying an impact load to a superhydrophobic material according to some embodiments of the present disclosure.

In some embodiments, when the pressure sensor is used in a continuous medium, each of the two metasurface media 9 is made of a superhydrophobic material 92.

The continuous medium refers to a substance with a stable heat transfer coefficient and a stable thermal conductivity at a certain temperature, such as water, oil, etc.

The superhydrophobic material 92 is a novel material capable of a self-cleaning area that requires cleanliness and may also be applied to a metal surface to prevent external corrosion.

In some embodiments of the present disclosure, when the pressure sensor is used in the continuous medium, the two metasurface media are made of the superhydrophobic material. This is because, in the continuous medium (e.g., water), bubbles 03 generated during explosion testing may impact a surface of the sensor. A surface of the superhydrophobic material may rapidly adsorb the bubbles, thereby pressing a water medium 04 surrounding the surface of the sensor outward. This configuration allows for an accurate response measurement of the sensor to bubble impacts.

In some embodiments of the present disclosure, by providing the two layers of metasurface media on the outer surfaces of the flexible composite encapsulation layer, and appropriately positioning the two metasurface media, different medium usage scenarios can be addressed, thus improving the measurement accuracy of the pressure sensor.

FIG. 2 is a flowchart illustrating an exemplary process of a method for preparing a composite thin film according to some embodiments of the present disclosure.

In some embodiments, a process 200 of the method for preparing the composite thin film includes the following operations, as shown in FIG. 2.

In 210, PVDF powder is weighed and poured into a container, and n N-methylpyrrolidone (NMP) solvent is added for mixing to obtain a film-casting solution.

The PVDF powder refers to a powdered crystalline polymer of PVDF.

The container refers to an apparatus for holding the film-casting solution. For example, the container includes at least one of a beaker, a volumetric flask, or the like.

NMP is an organic substance with a chemical formula $C_5H_9NO$ and is a colorless to light yellow transparent liquid. The NMP solvent means that the N-methylpyrrolidone is used as a solvent for mixing well with the PVDF powder.

The film-casting solution refers to a mixed solution including NMP and PVDF. The film-casting solution may also be referred to as a PVDF film-casting solution.

In some embodiments, mixing of the PVDF powder with the NMP solvent may be realized in a plurality of ways, for example, stirring, ultrasonic methods, or the like.

In some embodiments, the film-casting solution is obtained by mixing the PVDF powder with the NMP solvent. There are a plurality of ways for determining whether the PVDF powder is uniformly mixed with the NMP solvent, for example, by artificially observing a color, a state, or the like, of the film-casting solution. It may be determined that the PVDF powder is uniformly mixed with the NMP solvent when it is observed that there are no obvious particles in the film-casting solution and the color of the solution does not change.

In 220, a base plate is placed into a bottom of a solution tank, the film-casting solution is poured onto the base plate, and the film-casting solution is allowed to adhere uniformly to a top surface of the base plate. After the solution tank is placed in a constant-temperature environment and allowed to stand for a preset period, the solution tank is removed and placed on an evaporation table. The film-casting solution is allowed to solidify on the base plate to form a PVDF thin film after standing at a room temperature for one or more hours, and the base plate, along with the PVDF thin film on the base plate, is removed from the solution tank.

The base plate refers to a plate configured to support the film-casting solution. A clean base plate is free of adherents and is shaped to fit a shape of the PVDF thin film. The top surface refers to a side of the base plate that backs upward away from the solution tank.

The solution tank refers to a device configured to hold the base plate. The bottom refers to the bottom of the solution tank.

Adhering means that the film-casting solution adheres to the top surface of the base plate. In some embodiments, the film-casting solution is uniformly adhered to the top surface of the base plate, i.e., the film-casting solution is uniformly distributed and adhered to the top surface of the base plate.

The constant-temperature environment refers to an environment in which the temperature remains constant. In some embodiments, the constant-temperature environment is a constant-temperature environment at a low temperature. For example, the constant-temperature environment where the temperature is maintained at a low temperature in a range between 0° C. and 10° C., or the like. The low temperature may be preset based on actual requirements.

The preset period refers to a preset period of time for the solution tank to stand still, for example, 30 minutes, 1 hour, 2 hours, or the like. The preset period may be preset by a staff based on experience.

The evaporation table refers to an apparatus that allows the film-casting solution to form a thin film. In some embodiments, the film-casting solution is heated to produce vapor by placing the solution tank on the evaporation table, which in turn, after standing at the room temperature for one or more hours, causes the film-casting solution to solidify on the base plate to form the PVDF thin film. A duration for standing may be preset based on actual requirements.

The room temperature is within a third preset range. For example, the room temperature is in a range of 22° C.-28° C. As another example, the room temperature is in a range of 23° C.-17° C. The third preset range is preset based on actual requirements.

There are a plurality of ways to measure the room temperature, including, but not limited to, measuring by using a thermometer, an infrared thermometer, or the like.

The PVDF thin film refers to a thin film formed on the base plate by condensation of vapors from the film-casting solution.

In 230, the PVDF thin film solidified on the base plate is laser-cut, so that a PVDF block is formed on the base plate.

In some embodiments, a cross-section of the PVDF block is a square with a side length denoted as $L_1$; a thickness of the PVDF block is denoted as $M_1$, a diameter of each of two metal electrodes is denoted as D, and the length $L_1$ is positively related to the diameter D of each of the two metal electrodes.

In some embodiments, the length of $L_1$ is positively related to a size of the diameter D of each of the two metal electrodes, i.e., the larger the diameter D of each of the two metal electrodes, the longer $L_1$ is. In some embodiments, $L_1$ is determined based on the diameter D of each of the two metal electrodes by a preset equation. For example, $L_1$ is determined by Eq. (2). More details regarding Eq. (2) may be found in other contents of the present disclosure (e.g., the later description).

Laser-cutting may include a plurality of ways, for example, laser vapor cutting, laser oxygen cutting, or the like. In some embodiments, the laser-cutting refers to irradiating the PVDF thin film using a high-power density laser beam to cause the PVDF thin film to be heated to a vaporization temperature and evaporate to form holes. As the beam moves across the PVDF thin film, the holes continuously form a cut of a specific width, thereby completing the cutting of the PVDF thin film. The laser-cutting may be performed using equipment such as a laser cutting machine, or the like.

The PVDF block refers to a small piece of film after the cutting of the PVDF thin film is completed.

In some embodiments, a plurality of PVDF blocks 14 arranged in a matrix may be formed on the base plate 2 by the laser-cutting, as shown in FIG. 4.

In 240, carbon nanowires are straightened and placed on the PVDF block.

In some embodiments, as shown in FIG. 4, a plurality of transversely and longitudinally extending carbon nanowires 11 are straightened and uniformly affixed to the plurality of PVDF blocks 14, such that the plurality of carbon nanowires 11 form a grid-like structure, with each intersection of gridlines of the grid-like structure located on a corresponding PVDF block 14.

There are plurality of ways of realizing a relative positional relationship between the carbon nanowires and the PVDF blocks, for example, bonding, or the like.

More details regarding the carbon nanowires may be found in other contents of the present disclosure (e.g., description in connection with FIG. 1).

In 250, the base plate with the carbon nanowire is placed back into the solution tank, and a new film-casting solution is poured into the solution tank again, so that the new film-casting solution covers the carbon nanowire and the PVDF block. After the solution tank is placed into the constant-temperature environment for the preset period, the solution tank is removed and placed on the evaporation table. After the solution tank stands at the room temperature for one or more hours, the new film-casting solution is allowed to solidify on the base plate to form the composite thin film.

More details regarding the base plate, the solution tank, the constant temperature, the evaporation table, the room temperature, or the like may be found in other contents of the present disclosure (e.g., description in connection with operation 220).

The new film-casting solution is similar to the previously described film-casting solution and is obtained in a same way by repeating the operation 210, which will not be described herein. The new film-casting solution may also be referred to as a new PVDF film-casting solution.

The new film-casting solution covering the carbon nanowire and the PVDF block means that the new film-casting solution fills grids between the carbon nanowires and forms a new plane above the carbon nanowires.

In some embodiments, a thickness of a lower PVDF layer and a thickness of the PVDF block are the same, both being $M_1$; a diameter of the carbon nanowire is $M_2$, and a thickness of an upper PVDF layer is $M_3$.

In some embodiments, a thickness of the composite thin film, denoted as $M_4$, is within a fourth preset range. For example, the thickness $M_4$ of the composite thin film is in a range of 10 μm-50 μm. As another example, the thickness $M_4$ of the composite thin film is in a range of 20 μm-40 μm. As yet another example, the thickness $M_4$ of the composite thin film is in a range of 8 μm-55 μm. The fourth preset range is preset based on actual requirements.

In some embodiments, a ratio of $M_1$, $M_2$, and $M_3$ is within a fifth preset range. For example, the ratio of $M_1$, $M_2$, and $M_3$ is in a range of 10-25:4:15-30. As another example, the ratio of $M_1$, $M_2$, and $M_3$ is in a range of 15-20:4:20-25. As yet another example, the ratio of $M_1$, $M_2$, and $M_3$ is in a range of 3-27:4:13-32. The fifth preset range is preset based on actual requirements.

More details regarding the upper PVDF layer and the lower PVDF layer may be found in other contents of the present disclosure (e.g., description in connection with FIG. 1).

In some embodiments of the present disclosure, by reasonably setting the thickness of each layer of the composite thin film, an overall thickness of the resulting composite thin film can be optimized, leading to a higher sensitivity of the pressure sensor.

In some embodiments of the present disclosure, by the preparation method described above, it is possible to enhance the strength of the composite thin film obtained through the method, which further enhances the wrinkle-resistant ability of the PVDF thin film and improving the measurement accuracy of the pressure sensor.

Figure 6:
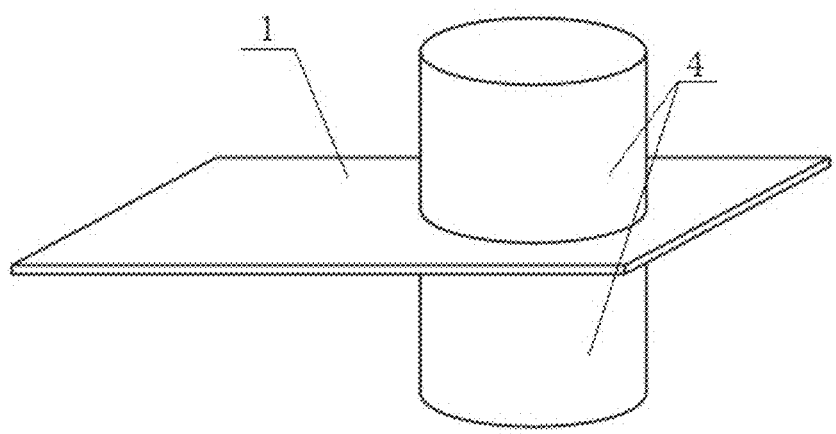
FIG. 6 is a schematic diagram illustrating polarization of polarizing indenters according to some embodiments of the present disclosure.
Figure 7:
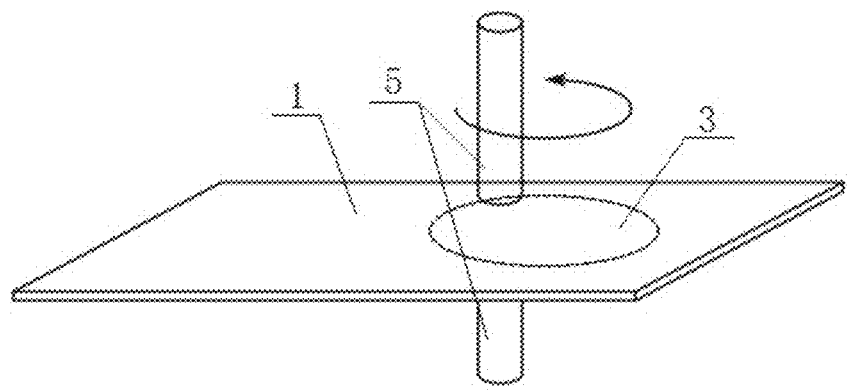
FIG. 7 is a schematic diagram illustrating depolarization of depolarizing indenters according to some embodiments of the present disclosure.

FIG. 6 is a schematic diagram illustrating polarization of polarizing indenters according to some embodiments of the present disclosure. FIG. 7 is a schematic diagram illustrating depolarization of depolarizing indenters according to some embodiments of the present disclosure.

In some embodiments, as shown in FIG. 6 and FIG. 7, a chromium film is plated in a polarized region on one of the two surfaces of the composite thin film 1. Two metal electrodes are formed by sputtering a metal layer on the chromium film, and two polarizing indenters 4 are oriented toward the two metal electrodes to polarize the polarized region of the composite thin film between the two metal electrodes. After polarization is completed, reverse polarization is performed using two depolarizing indenters 5.

More details regarding the polarized region may be found in other contents of the present disclosure (e.g., description in connection with FIG. 1).

In some embodiments, a piezoelectric coefficient $D_{33}$ of the polarized region of the composite thin film satisfies the following equation:

$$D_{33} = \begin{pmatrix} D_1 \\ D_2 \\ D_3 \end{pmatrix} = \frac{N}{\varepsilon_j} \begin{pmatrix} d_{11} & d_{12} & d_{13} & d_{14} & d_{15} & d_{16} \\ d_{21} & d_{22} & d_{23} & d_{24} & d_{25} & d_{26} \\ d_{31} & d_{32} & d_{33} & d_{34} & d_{35} & d_{36} \end{pmatrix} \begin{pmatrix} T_1 \\ T_2 \\ T_3 \\ T_4 \\ T_5 \\ T_6 \end{pmatrix} \quad (1)$$

In Eq. (1), $D_i$ denotes an electric displacement generated in a direction i, and i takes the value of an integer from 1-3; $T_j$ denotes stress received by a force in a direction j, and j takes the value of an integer from 1-6; $d_{ij}$ is the piezoelectric coefficient, i denotes a direction of charge generation, and j denotes a direction of the force; N denotes a target value in a hypergravity environment, which is a dimensionless parameter; and $\varepsilon_j$ denotes an adjustment coefficient for the direction of charge generation, which is a dimensionless parameter. The target value in the hypergravity environment may also be referred to as a hypergravity ring target value.

The direction i represents a polarization direction: when a surface generating charge is perpendicular to an x-axis, i=1; when the surface generating charge is perpendicular to a y-axis, i=2; and when the surface generating charge is perpendicular to a z-axis, i=3. The x-axis denotes a horizontal direction, the y-axis denotes a direction perpendicular to the x-axis in a horizontal plane, and the z-axis denotes a vertical direction perpendicular to the horizontal plane.

If the direction j takes the value of 1, it indicates normal stress acting along the x-axis; if the direction j takes the value of 2, it indicates normal stress acting along the y-axis; if the direction j takes the value of 3, it indicates normal stress acting along the z-axis; if the direction j takes the value of 4, it indicates shear stress acting in a plane perpendicular to both the x-axis and y-axis; if the direction j takes the value of 5, it indicates shear stress acting in a plane perpendicular to both the y-axis and z-axis; and if the direction j takes the value of 6, it indicates shear stress acting in a plane perpendicular to both the x-axis and z-axis.

In some embodiments, the target value in the hypergravity environment is preset and selected based on an application scenario. For example, in a 100 g hypergravity environment, the target value N=100. 100 g hypergravity refers to a gravitational acceleration that is 100 times of a standard gravitational acceleration in a hypergravity environment. N indicates the multiple of hypergravity acceleration relative to the standard gravitational acceleration value g. The adjustment coefficient may be preset based on experience.

In some embodiments of the present disclosure, the piezoelectric coefficient $D_{33}$ is determined by fusing the target value in a hypergravity environment and the adjustment coefficient for the direction of charge generation, such that the flexible thin film pressure sensor can evaluate a polarization degree of the composite thin film by completing a test in the hypergravity environment in a normal gravity environment. By determining a minimum value of the piezoelectric coefficient $D_{33}$ in the hypergravity environment, the value is used to control the electric field strength, temperature, and duration during the polarization process, ensuring that the polarized composite film achieves the minimum value of $D_{33}$.

The chromium film refers to a film formed with elemental chromium as the film material in the polarized region on the surface of the composite thin film.

Sputtering is one kind of PVD thin film preparation technology, which is mainly categorized into DC sputtering, AC sputtering, reactive sputtering, magnetron sputtering, or the like. Sputtering a metal layer refers to sputtering on the chromium film to make the two metal electrodes.

The polarizing indenters are components that apply a voltage for polarization to the metal electrodes.

The polarization refers to a treatment process in which an electric field is applied to change a charge distribution in the polarized region of the composite thin film, to produce a polarization effect on a surface of the polarized region.

The polarization effect refers to an effect when an external electric field, magnetic field, or other influences cause a disturbance in an internal charge distribution of a material, leading to the formation of an electric field between positive and negative ions within the material. The polarization effect alters the material structure and changes some physical property parameters of the crystal.

The depolarizing indenters are components that apply a voltage of reverse polarization to the metal electrodes.

The reverse polarization refers to a treatment process that causes the polarization effect in the polarized region of the composite thin film to change direction in response to a change in the applied electric field. In some embodiments, the reverse polarization may also be referred to as reverse low-voltage polarization. The reverse low-voltage polarization refers to applying a voltage in the opposite direction of polarization to achieve an opposite piezoelectric effect. A voltage for polarization, a voltage for reverse low-voltage polarization, and a processing time may be preset based on actual requirements. Exemplarily, the voltage for polarization is 5.8 kV, and the processing time for polarization is 1200 seconds. The voltage for the reverse low-voltage polarization is 3 kV, and the processing time for polarization is 120 seconds.

In some embodiments, each of the two depolarizing indenters is moved along a contour line of the corresponding metal electrode to achieve the reverse polarization and accurately eliminate an edge halo.

In some embodiments, a structure and a material of each of the two depolarizing indenters are the same as a structure and a material of each of the two polarizing indenters. A ratio of a diameter of each of the two polarizing indenters to the diameter D of each of the two metal electrodes is within a six preset range. For example, the ratio of the diameter of each of the two polarizing indenters to the diameter D of each of the two metal electrodes ranges from 1.05 to 1.2. As another example, the ratio of the diameter of each of the two polarizing indenters to the diameter D of each of the two metal electrodes ranges from 1.1 to 1.15. As yet another example, the ratio of the diameter of each of the two polarizing indenters to the diameter D of each of the two metal electrodes ranges from 1-1.25. A size of the six preset range is preset based on actual requirements.

A ratio of a diameter of each of the two depolarizing indenters to the diameter D of the metal electrode is within a seventh preset range. For example, the ratio of the diameter of each of the two depolarizing indenters to the diameter D of each of the two metal electrodes ranges from 0.1 to 0.2. As another example, the ratio of the diameter of each of the two depolarizing indenters to the diameter D of each of the two metal electrodes ranges from 0.12 to 0.18. As yet another example, the ratio of the diameter of each of the two depolarizing indenters to the diameter D of each of the two metal electrodes ranges from 0.08 to 0.22. A size of the seventh preset range is preset based on actual requirements.

In some embodiments of the present disclosure, by reasonably setting relevant parameters of the polarizing indenters and the depolarizing indenters, it is possible to make the polarization and the reverse polarization of the polarized region more accurate, and to improve the performance of the composite thin film. By setting the ranges of the ratios of the diameters of the polarizing indenters and the depolarizing indenters to the diameter of the metal electrode, it can be ensured that the polarization occurs within the polarized region, thereby minimizing an impact on the rest of the composite thin film.

In some embodiments of the present disclosure, the metal electrodes fabricated can be made more stable by plating the chromium film and sputtering of a metal layer, and the strength of the composite thin film can be enhanced. In a 100 g hypergravity environment, a size amplification effect in a geotechnical experiment resulted a diameter of the pressure sensor being effectively amplified by 100 times, which allows for localized polarization treatment between the composite film and the metal electrodes. Additionally, to obtain piezoelectric units with clear boundaries, and by employing a technique where a piezoelectric constant is zero under AC polarization, the depolarization indenters introduce reverse low-voltage polarization to eliminate edge halos, thereby achieving more precise measurements of piezoelectric films (e.g., a PVDF nanowire composite thin film).

Figure 9:
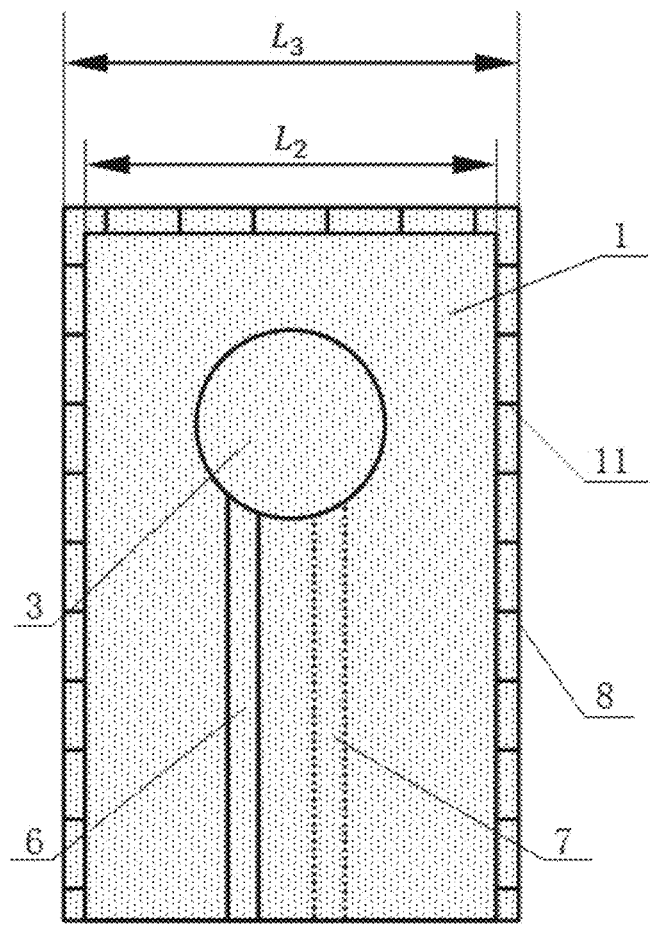
FIG. 9 is a plan view of a PVDF nanowire composite film encapsulated with a flexible composite encapsulation layer according to some embodiments of the present disclosure.

FIG. 9 is a plan view of a PVDF nanowire composite film encapsulated with a flexible composite encapsulation layer according to some embodiments of the present disclosure.

In some embodiments, as shown in FIG. 9, the polarized composite thin film 1 is cut, so that only the carbon nanowire 11 is retained in edge portions of a rectangular ring of the composite thin film 1. A first electrode wire 6 and a second electrode wire 7 are led out from two metal electrodes 3, respectively, the first electrode wire 6 and the second electrode wire 7 are led out from one side of the composite thin film 1. The carbon nanowire, in the edge portion of the one side of the composite thin film 1 from which the first electrode wire 7 and the second electrode wire 8 are led out, is removed, and the flexible composite encapsulation layer 8 is fixed. The carbon nanowire 11 in the edge portion of each of the other three sides of the composite thin film 1 is encapsulated in the flexible composite encapsulation layer 8.

The cutting of the polarized composite thin film 1 refers to a treatment process in which a rectangular edge portion of the composite thin film is removed, so that only the carbon nanowire is retained in the edge portions of the composite thin film. The cutting of the polarized composite thin film may be realized in a plurality of ways, for example, by a laser cutter, or the like.

The first electrode wire 6 and the second electrode wire 7 refer to wires led out from the two metal electrodes, respectively.

In some embodiments, as shown in FIG. 9, the first electrode wire 6 and the second electrode wire 7 are led out from a wide side of the composite thin film 1. The wide side refers to a longer side of the rectangular ring of the composite thin film.

There are a plurality of ways of fixing the flexible composite encapsulation layer 8, for example, bonding, or the like.

The composite thin film 1 being encapsulated in the flexible composite encapsulation layer 8 refers to that the carbon nanowire 11 in the edge portion of each of the other three sides of the composite thin film 1 are completely wrapped by the flexible composite encapsulation layer 8.

In some embodiments, as shown in FIG. 9, after carbon nanowire 11, in the edge portion of the one side of the composite thin film 1 from which the first electrode wire and the second electrode wire are led out, is removed, a longitudinal central axis of a remaining portion of the composite thin film 1 overlaps with a longitudinal central axis of the flexible composite encapsulation layer 8, a width of the remaining portion of the composite thin film is denoted as $L_2$, a width of the flexible composite encapsulation layer 8 is denoted as $L_3$, a size of the width $L_2$ is positively related to the diameter D of each of the two metal electrodes, a size of the width $L_3$ is positively related to the size of the width $L_2$.

In some embodiments, the size of the width $L_2$ is positively related to the diameter D of each of the two metal electrodes, i.e., the larger the diameter D of the metal electrode, the larger the width $L_2$. In some embodiments, the width $L_2$ may be determined based on the diameter of D of the metal electrode by a preset equation. For example, the width $L_2$ is determined by Eq. (3). More details regarding Eq. (3) may be found in other contents of the present disclosure (e.g., the later description).

In some embodiments, the size of $L_3$ is positively related to the size of $L_2$, i.e., the larger the $L_2$, the larger the $L_3$. In some embodiments, $L_3$ may be determined based on $L_2$ by a preset equation. For example, $L_3$ is determined by Eq. (4). More details regarding Eq. (4) may be found in other contents of the present disclosure (e.g., the later description).

In some embodiments of the present disclosure, by setting the relationship between the width of the remaining composite thin film and the diameter of each of the two metal electrodes, it is possible to make the composite thin film sufficiently wrap the two metal electrodes, so that the width of the remaining composite thin film and the width of the flexible composite encapsulation layer are set more reasonably, and the performance of the pressure sensor can be effectively improved.

In some embodiments of the present disclosure, the electrical conductivity of the composite thin film can be effectively enhanced by cutting the composite thin film and leading out the first electrode wire and the second electrode wire. Encapsulating the foregoing composite thin film by the flexible composite encapsulation layer can improve the stability of the pressure sensor.

FIG. 3 is a flowchart illustrating an exemplary process of a method for preparing a flexible composite encapsulation layer according to some embodiments of the present disclosure.

In some embodiments, as shown in FIG. 3 and FIG. 8, the method for preparing the flexible composite encapsulation layer 8 includes the following operations: preparing a lower PDMS layer 85 on a bottom surface of a GeSbTe film, the GeSbTe film and the lower PDMS layer 85 having a same thickness; performing a plurality of indentation processes on a top surface of the GeSbTe film, so that a plurality of grooves arranged in a grid-like pattern are formed on a bottom surface of the lower PDMS layer 85; after a period of time, allowing a bottom surface of the lower PDMS layer 85 to rebound back to a planar structure, and the GeSbTe film forms a double-layer structure; and obtaining the flexible composite encapsulation layer 8 by fixing a layer of silicon nitride film 82 on the top surface of the GeSbTe film, and fixing a layer of an upper PDMS layer 81 on a top surface of the silicon nitride film 82.

More details regarding the flexible composite encapsulation layer 8, the GeSbTe film, the lower PDMS layer 85, the silicon nitride film 82, the upper PDMS layer 81, or the like may be found in other contents of the present disclosure (e.g., description in connection with FIG. 1).

In some embodiments, as shown in FIG. 3, a process 300 includes the following operations.

In 310, a lower PDMS layer 85 is prepared and disposed on a bottom surface of a GeSbTe film.

In some embodiments, as shown in FIG. 8, the GeSbTe film and the lower PDMS layer 85 have the same thickness.

In 320, a plurality of indentation processes are performed on a top surface of the GeSbTe film, so that a plurality of grooves arranged in a grid-like pattern are formed on a bottom surface of the lower PDMS layer; and after the period of time, a bottom surface of the lower PDMS layer is allowed to rebound back to a planar structure, and the GeSbTe film forms a double-layer structure.

The indentation process refers to using a steel wire or similar tool to create grooves on the top surface of the GeSbTe film for bending purposes.

In some embodiments, as shown in FIG. 8, a bottom surface of the GeSbTe film is pressed down to the lower PDMS layer 85 by the indentation processes, resulting in the plurality of grooves arranged in the grid-like pattern being formed on the bottom surface of the lower PDMS layer 85.

The period of time refers to an amount of time that takes for the bottom surface of the lower PDMS layer 85 to rebound. The period of time may be preset based on actual requirements.

In some embodiments, as shown by the first arrow in FIG. 8, after placement for the period of time, the bottom surface of the lower PDMS layer 85 rebounds back to the planar structure, and a portion of the GeSbTe film that has been pressed down does not rebound and is wrapped by the top surface of the lower PDMS layer 85, forming the double-layer structure.

The planar structure refers to a structure in which the bottom surface of the lower PDMS layer remains flat.

In 330, a flexible composite encapsulation layer is obtained by fixing a layer of a silicon nitride film on the top surface of the GeSbTe film and fixing a layer of an upper PDMS layer on a top surface of the silicon nitride film.

In some embodiments, as shown in FIG. 8, the top surface of the GeSbTe film refers to a surface of the upper GeSbTe film 83 that is away from the lower PDMS layer 85.

In some embodiments, there are a plurality of ways to fix the silicon nitride film 82, for example, bonding, or the like. There are a plurality of ways to fix the upper PDMS layer 81, for example, bonding, or the like.

In some embodiments, a layer of the silicon nitride film 82 is fixed on the top surface of the upper GeSbTe film 83 as shown by the second arrow in FIG. 8, and a layer of the upper PDMS layer 81 is fixed on the top surface of the silicon nitride film 82 to obtain the flexible composite encapsulation layer 8 as shown by the third arrow in FIG. 8.

In some embodiments of the present disclosure, the flexible composite encapsulation layer including the upper PDMS layer, the silicon nitride film, the GeSbTe film, and the lower PDMS layer can be obtained by the above-described preparation method. This enhances a thermal insulation effect of the flexible composite encapsulation layer, ensuring that the pressure sensor is not affected by an operation of an overweight centrifugal machine or by experiments involving significant temperature changes, thus ensuring measurement sensitivity and accuracy.

Some embodiments of the present disclosure provide a flexible thin film pressure sensor applicable in a hypergravity centrifugal environment, the flexible thin film pressure sensor including a PVDF nanowire composite thin film 1, two metal electrodes 3, and a flexible composite encapsulation layer 8.

In some embodiments, the PVDF nanowire composite thin film 1 includes a PVDF matrix and a plurality of carbon nanowires 11 filled within the PVDF matrix and arranged in a grid-like pattern.

In some embodiments, the PVDF matrix includes a lower PVDF layer 12 disposed directly below the carbon nanowires, and an upper PVDF layer 13 that is completely filled in grids of the carbon nanowires 11 and disposed directly above the carbon nanowires 11.

In some embodiments, a ratio of a diameter of the carbon nanowire to a thickness of the PVDF matrix ranges from 0.1 to 0.15, and a ratio of a thickness of the lower PVDF layer to a thickness of the upper PVDF layer ranges from 1 to 1.5.

In some embodiments, the two metal electrodes are fixed to two surfaces of the PVDF nanowire composite thin film and overlap with each other, and a region of the PVDF nanowire composite thin film located between the two metal electrodes is a polarized region.

In some embodiments, the flexible composite encapsulation layer has a double-layer structure, the double-layered flexible composite encapsulation layer is bonded to the two surfaces of the PVDF nanowire composite thin film, and edge portions of the double-layered flexible composite encapsulation layer extend beyond the PVDF nanowire composite thin film and are bonded to each other, so that the PVDF nanowire composite thin film is completely covered in the double-layered flexible composite encapsulation layer.

In some embodiments, each layer of the double-layered flexible composite encapsulation layer is formed by laminating an upper PDMS layer 81, a silicon nitride film 82, a GeSbTe film, and a lower PDMS layer 85 from top to bottom.

In some embodiments, the GeSbTe film has a double-layer structure, wherein each of an upper GeSbTe film and a lower GeSbTe film of the double-layer GeSbTe film is composed of a plurality of GeSbTe blocks.

In some embodiments, the upper GeSbTe film and the lower GeSbTe film form into a grid-like crossed structure, i.e., a region between any two adjacent GeSbTe blocks of the upper GeSbTe film completely overlaps with a GeSbTe block of the lower GeSbTe film.

In some embodiments, the lower GeSbTe film extends and is wrapped into the lower PDMS layer, such that a region between any two adjacent GeSbTe blocks of the lower GeSbTe film is filled with PDMS, and the region between any two adjacent GeSbTe blocks of the upper GeSbTe film includes a hollow structure.

In some embodiments, in each layer of the double-layered flexible composite encapsulation layer, a bottom surface of the lower PDMS layer is bonded to a surface of the PVDF nanowire composite thin film, and edge portions of the bottom surfaces of the lower PDMS layers of the two layers of the double-layered flexible composite encapsulation layer are bonded and fixed to each other.

S1, a method for preparing the PVDF nanowire composite thin film may include the following operations.

In S11, x grams of PVDF powder are weighed and poured into a container, at the same time, an NMP solvent that is (k×x) times the amount of the PVDF powder is added to mix thoroughly to obtain a PVDF casting film solution.

The value of k ranges from 9.35 to 11.23. In some embodiments, the value of k is preset based on actual requirements.

In S12, a clean base plate 2 (e.g., sapphire substrate) is placed into a bottom of a solution tank, the prepared PVDF film-casting solution is poured onto the base plate 2, and the prepared PVDF film-casting solution is allowed to adhere uniformly to a top surface of the base plate 2. After the solution tank is placed in a low-temperature constant environment and allowed to stand for a certain period, the solution tank is removed and placed on an evaporation table, and the prepared PVDF film-casting solution is allowed to solidify on the base plate 2 to form a PVDF thin film after the prepared PVDF film-casting solution stands at a room temperature ranging from 22° C. to 28° C. for several hours. Then the base plate 2 along with the PVDF thin film on the base plate 2 are removed from the solution tank.

In S13, the solidified PVDF thin film on the base plate 2 is laser-cut, so that a plurality of PVDF blocks 14 in a matrix arrangement are formed on the base plate 2. A cross-section of each of the plurality of PVDF blocks 14 is a square with a side length denoted as $L_1$, a thickness of each of the plurality of PVDF blocks 14 is denoted as $M_1$, a diameter of each of the two metal electrodes is denoted as D, and the length $L_1$ satisfies the following Equation (2):

$$L_1 = k_1 \times D \tag{2}$$

In Eq. (2), the value of $k_1$ ranges from 0.0021 to 0.0045. In some embodiments, the value of $k_1$ is preset based on actual requirements.

In S14, a plurality of carbon nanowires 11 extending transversely and longitudinally are straightened and uniformly bonded to the plurality of PVDF blocks 14, such that the plurality of carbon nanowires 11 form a grid-like structure, with each intersection of grid lines of the grid-like structure located on a corresponding PVDF block 14 (see FIG. 4).

In S15, the base plate 2 with the carbon nanowires pasted on it is placed back into the solution tank, and a new PVDF film-casting solution is poured into the solution tank again, so that the new PVDF film-casting solution completely covers the carbon nanowires 11 and the plurality of PVDF blocks 14. After the solution tank is placed into a low-temperature constant-temperature environment to stand for a certain period, the solution tank is removed and placed on the evaporation table. After the solution tank stands at the room temperature ranging from 22° C. to 28° C. for several hours, the new PVDF film-casting solution is allowed to solidify on the base plate 2 to form the PVDF nanowire composite thin film 1.

See FIG. 5, a thickness of the lower PVDF layer 12 directly below the carbon nanowires 11 in the PVDF nanowire composite thin film and the thickness of the PVDF block 14 are the same, both being $M_1$, a diameter of the carbon nanowire 11 is $M_2$, a thickness of the upper PVDF layer 13 directly above the carbon nanowires 11 is $M_3$, and a thickness of the PVDF nanowire composite thin film 1, denoted as $M_4$, is in a range of 10 μm-50 μm. A ratio of $M_1$, $M_2$, and $M_3$ is 15:4:18.

S2, two metal electrodes 3 are respectively fixed to two surfaces of the PVDF nanowire composite thin film 1 and overlap with each other. The metal electrodes 3 refer to metal electrodes made by plating a chromium film in a polarized region on the surface of the PVDF nanowire composite thin film 1, then sputtering a metal layer on the chromium film.

In some embodiments, as shown in FIG. 6 and FIG. 7, a region of the PVDF nanowire composite thin film 1 located between the two metal electrodes 3 is the polarized region. Two polarizing indenters 4 are oriented toward the two metal electrodes 3 to polarize the polarized region of the PVDF nanowire composite thin film 1 between the two metal electrodes 3. After polarization is completed, a reverse low-voltage polarization is performed by using two depolarizing indenters 5, i.e., the two depolarizing indenters 5 are respectively moved along a contour line of the metal electrodes 3 to realize depolarization and eliminate an edge halo. A structure and a material of each of the two depolarizing indenter 5 are the same as a structure and a material of each of the two polarizing indenters 4, a ratio of a diameter of each of the two polarizing indenters 4 to the diameter D of each of the two metal electrodes 3 ranges from 1.05 to 1.2, and a ratio of a diameter of each of the two depolarizing indenters 5 to the diameter D of each of the two metal electrodes 3 ranges from 0.1 to 0.2.

S3, see FIG. 9, after polarization is completed, the polarized PVDF nanowire composite thin film 1 is cut, so that only the carbon nanowires 11 are retained in edge portions of a rectangular ring of the PVDF nanowire composite thin film.

In some embodiments, a first electrode wire 6 and a second electrode wire 7 are led out from the two metal electrodes 3, respectively. The first electrode wire 6 and the second electrode wire 7 are led out from one wide side of the PVDF nanowire composite thin film. The carbon nanowires 11, in the edge portion of the one wide side of the PVDF nanowire composite thin film from which the first electrode wire 6 and the second electrode wire 7 are led out, is removed, and then the double-layered flexible composite encapsulation layer 8 is bonded.

In some embodiments, two layers of the double-layered flexible composite encapsulation layer 8 are bonded to the two surfaces of the PVDF nanowire composite thin film 1, respectively, and the carbon nanowire 11 in the edge portion of each of the other three sides of the PVDF nanowire composite thin film 1 is encapsulated and bonded in the double-layered flexible composite encapsulation layer 8.

In some embodiments, after the carbon nanowires 11, in the edge portion of the one wide side of the PVDF nanowire composite thin film from which the first electrode wire 6 and the second electrode wire 7 are led out, are removed, a longitudinal central axis of a remaining portion of the PVDF nanowire composite thin film overlaps with a longitudinal central axis the flexible composite encapsulation layer. A width of the remaining portion of the PVDF nanowire composite thin film 1 is denoted as $L_2$, a width of the flexible composite encapsulation layer 8 is denoted as $L_3$, and the values of $L_2$ and $L_3$ satisfy the following Equations (3) and (4):

$$L_2 = k_2 \times D \tag{3}$$

$$L_3 = k_3 \times L_2 \tag{4}$$

In Eqs. (3) and (4), D denotes the diameter of the metal electrode, the value of $k_2$ ranges from 2.15 to 4.65, and the value of $k_3$ ranges from 1.02 to 1.05. In some embodiments, the values of $k_2$ and $k_3$ may be preset based on actual requirements.

See FIG. 8, each layer of the double-layered flexible composite encapsulation layer 8 is formed by laminating the upper PDMS layer 81, the silicon nitride film 82, the GeSbTe film, and the lower PDMS layer 85 from top to bottom, and a method for preparing the flexible composite encapsulation layer may include the following operations.

In S31, the lower PDMS layer 85 is prepared and disposed on a bottom surface of the GeSbTe film. The GeSbTe film and the lower PDMS layer 85 have a same thickness.

In S32, a plurality of indentation processes are performed on a top surface of the GeSbTe film, so that a plurality of grooves arranged in a grid-like pattern are formed on a bottom surface of the lower PDMS layer. After being placed for a period of time, the bottom surface of the lower PDMS layer is allowed to rebound back to a planar structure, and the GeSbTe film forms a double-layer structure.

In some embodiments, a nanoindentation apparatus is used to perform the plurality of indentation processes on the top surface of the GeSbTe film, causing the GeSbTe film to form the double-layer structure.

In some embodiments, each of the upper GeSbTe film 83 and the lower GeSbTe film 84 is composed of a plurality of GeSbTe blocks. The upper GeSbTe film 83 and the lower GeSbTe film 84 form into a grid-like crossed structure, i.e., a region between any two adjacent GeSbTe blocks of the upper GeSbTe film 83 completely overlaps with a GeSbTe block of the lower GeSbTe film 84.

In some embodiments, the lower GeSbTe film 84 extends and is wrapped into the lower PDMS layer 85, such that the region between any two adjacent GeSbTe blocks of the lower GeSbTe film 84 is filled with PDMS. The region between any two adjacent GeSbTe blocks of the upper GeSbTe film 83 is the hollow structure.

In some embodiments, after the indentation processes are completed, the plurality of grooves arranged in the grid-like pattern are formed on the bottom surface of the lower PDMS layer 85, and after being placed for a period of time, the bottom surface of the lower PDMS layer 85 is allowed to rebound back to the planar structure, and the GeSbTe film forms the double-layer structure.

In some embodiments, a distance between any two adjacent GeSbTe blocks of the upper GeSbTe film 83 is $L_5$, a distance between any two adjacent GeSbTe blocks of the lower GeSbTe film 84 is $L_4$, and the value of $L_4$ satisfies the following Equation (5), and the value of $L_5$ satisfies the following Equation (6):

$$L_4 = k_4 \times D \tag{5}$$

$$L_5 = k_5 \times L_4 \tag{6}$$

In Eqs. (5) and (6), D denotes the diameter of the metal electrode, the value of $k_4$ ranges from 0.721 to 0.956, and the value of $k_5$ ranges from 0.921 to 1.123. In some embodiments, the values of $k_4$ and $k_5$ may be preset based on actual requirements.

In S33, the flexible composite encapsulation layer 8 is obtained by bonding a layer of the silicon nitride film 82 on the top surface of the GeSbTe film and bonding the upper PDMS layer 81 on a top surface of the silicon nitride film 82.

S4, see FIG. 1, two layers of metasurface media are bonded and fixed on two outer surfaces of the double-layered flexible composite encapsulation layer 8.

In some embodiments, the two metasurface media 9 are concentric with the polarized region of the PVDF nanowire composite thin film 1, and the two metasurface media 9 completely cover the polarized region of the PVDF nanowire composite thin film 1 and overlap with each other.

In some embodiments, a diameter of each of the two metasurface media 9 is $D_2$, a thickness of each of the two metasurface media 9 is $M_5$, and values of $D_2$ and $M_4$ satisfy the following Equations (7) and (8), respectively:

$$D_2 = k_6 \times D \tag{7}$$

$$M_5 = k_7 \times M_4 \tag{8}$$

In Eqs. (7) and (8), D denotes the diameter of the metal electrode 3, $M_4$ denotes the thickness of the PVDF nanowire composite thin film 1, the value of $k_6$ ranges from 1.45 to 1.67, and the value of $k_7$ ranges from 1.25 to 1.41. In some embodiments, the values of $k_6$ and $k_7$ may be preset based on actual requirements.

In some embodiments, as shown in FIG. 10, when the flexible thin film pressure sensor is used in a discontinuous medium (e.g., sandy soil 01), each of the two metasurface media is made of a hydrophilic material 91. In some embodiments, the hydrophilic material 91 may include titanium dioxide, zinc oxide, alumina, graphene oxide, polyvinyl alcohol, chitosan membranes, metal oxides, carbon-based hydrophilic material, or the like. The hydrophilic material 91 may adsorb moisture 02 in the sandy soil 01, trapping the moisture on a surface of hydrophilic material 91. This allows the pressure sensor to have a more uniform stress distribution when subjected to an impact load from the sandy soil 01, resulting in more accurate measurement data.

In some embodiments, as shown in FIG. 111, when the flexible thin film pressure sensor is used in water, the two metasurface media are made of a superhydrophobic material 92. In some embodiments, the superhydrophobic material 92 may include polytetrafluoroethylene, titanium alloy, a waxy material, a cellulose-based superhydrophobic material, or the like. Bubbles 03 generated during an explosion test may impact the surface of the sensor, and a surface of the superhydrophobic material 92 can quickly adsorb the bubbles 03, thereby squeezing the a water medium 04 on the surface of the sensor outward. This effectively captures a response of the sensor to the impact of the bubble.

More details regarding this section may be found in other contents of the present disclosure (e.g., descriptions in connection with FIG. 1-FIG. 3).

Having thus described the basic concepts, it may be rather apparent to those skilled in the art after reading this detailed disclosure that the foregoing detailed disclosure is intended to be presented as illustrative example and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of the present disclosure.

Moreover, certain terminology has been configured to describe embodiments of the present disclosure. For example, the terms "one embodiment," "an embodiment," and/or "some embodiments" mean that a particular feature, structure, or characteristic described in connection with the embodiment is included in at least one embodiment of the present disclosure. Therefore, it is emphasized and should be appreciated that two or more references to "an embodiment" or "one embodiment" or "an alternative embodiment" in various portions of this disclosure are not necessarily all referring to the same embodiment. Furthermore, the particular features, structures, or characteristics may be combined as suitable in one or more embodiments of the present disclosure.

Furthermore, the recited order of processing elements or sequences, or the use of numbers, letters, or other designations, therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution, e.g., an installation on an existing server or mobile device.

Similarly, it should be noted that in the foregoing description of embodiments of the present disclosure, various features are sometimes grouped together in a single embodiment, figure, or description thereof for the purpose of streamlining the disclosure aiding in the understanding of one or more of the various inventive embodiments. This way of disclosure, however, is not to be interpreted as reflecting an intention that the claimed subject matter requires more features than are expressly recited in each claim. Rather, inventive embodiments lie in less than all features of a single foregoing disclosed embodiment.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting effect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the present disclosure disclosed herein are illustrating of the principles of the embodiments of the present disclosure. Other modifications that may be employed may be within the scope of the present disclosure. Thus, by way of example, but not of limitation, alternative configurations of the embodiments of the present disclosure may be utilized in accordance with the teachings herein. Accordingly, embodiments of the present disclosure are not limited to that precisely as shown and described.

What is claimed is:

1. A flexible thin film pressure sensor applicable in a hypergravity centrifugal environment, comprising a polyvinylidene fluoride (PVDF) nanowire composite thin film, two metal electrodes, and a flexible composite encapsulation layer; wherein the PVDF nanowire composite thin film includes a PVDF matrix and a plurality of carbon nanowires filled within the PVDF matrix in a grid-like structure; the PVDF matrix includes a lower PVDF layer disposed directly below the carbon nanowires and an upper PVDF layer that is completely filled in grids of the carbon nanowires and disposed directly above the carbon nanowires, a thickness of the lower PVDF layer directly below the carbon nanowires is $M_1$, which is equal to a thickness of a PVDF block, a diameter of the carbon nanowires is $M_2$, a thickness of the upper PVDF layer completely filled in grids of the carbon nanowires and disposed directly above the carbon nanowires is $M_3$, a total thickness $M_4$ of the PVDF nanowire composite thin film is in a range from 10 μm to 50 μm, and a ratio of $M_1$, $M_2$, and $M_3$ is 15:4:18;

the two metal electrodes are respectively fixed to two surfaces of the PVDF nanowire composite thin film and overlap with each other, and a region of the PVDF nanowire composite thin film located between the two metal electrodes is a polarized region;

the flexible composite encapsulation layer has a double-layer structure, two layers of the double-layered flexible composite encapsulation layer are disposed on the two surfaces of the PVDF nanowire composite thin film, respectively, and edge portions of the flexible composite encapsulation layer extend beyond the PVDF nanowire composite thin film and are adhesively fixed to each other, such that the PVDF nanowire composite thin film is encapsulated within the double-layered flexible composite encapsulation layer;

each layer of the double-layered flexible composite encapsulation layer is formed by laminating an upper polydimethylsiloxane (PDMS) layer, a silicon nitride film, a germanium-antimony-tellurium (GeSbTe) film, and a lower PDMS layer from top to bottom; the GeSbTe film has a double-layer structure, wherein each of an upper GeSbTe film and a lower GeSbTe film of the double-layered GeSbTe film is composed of a plurality of GeSbTe blocks; the upper GeSbTe film and the lower GeSbTe film form into a grid-like crossed structure, wherein a region between any two adjacent GeSbTe blocks of the upper GeSbTe film completely overlaps with a GeSbTe block of the lower GeSbTe film; the lower GeSbTe film extends and is wrapped into the lower PDMS layer, such that a region between any two adjacent GeSbTe blocks of the lower GeSbTe film is filled with PDMS; the region between any two adjacent GeSbTe blocks of the upper GeSbTe film is a hollow structure; in each layer of the double-layered flexible composite encapsulation layer, a bottom surface of the lower PDMS layer is disposed on one of the two surfaces of the PVDF nanowire composite thin film; and edge portions of the bottom surfaces of the lower PDMS layers of the two layers of the double-layered flexible composite encapsulation layer are adhesively fixed to each other.

2. The pressure sensor of claim 1, wherein a method for preparing the PVDF nanowire composite thin film includes:

weighing PVDF powder, pouring the PVDF powder into a container, and adding an N-methylpyrrolidone (NMP) solvent for mixing to obtain a PVDF film-casting solution;

placing a clean base plate into a bottom of a solution tank, pouring the PVDF film-casting solution onto the base plate, and allowing the PVDF film-casting solution to adhere uniformly to a top surface of the base plate; after placing the solution tank in a constant low-temperature environment and allowing the solution tank to stand for a preset period, transferring the solution tank to an evaporation table and allowing the solution tank to stand at a room temperature in a range from 22° C. to 28° C. for a plurality of hours until the PVDF film-casting solution solidifies on the base plate to form a PVDF thin film; and removing the base plate along with the PVDF thin film on the base plate from the solution tank;

laser-cutting the PVDF thin film solidified on the base plate, so that a plurality of PVDF blocks arranged in a matrix are formed on the base plate, wherein a cross-section of each of the PVDF blocks is a square with a side length denoted as $L_1$; a thickness of the PVDF block is denoted as $M_1$, a diameter of each of the two metal electrodes is denoted as D, and the length $L_1$ satisfies the following equation:

$$L_1 = k_1 \times D,$$

wherein $k_1$ takes a value in a range from 0.0021 to 0.0045;

straightening a plurality of carbon nanowires extending transversely and longitudinally and uniformly bonding the plurality of carbon nanowires to the plurality of PVDF blocks, such that the plurality of carbon nanowires 11 form a grid-like structure, with each intersection of grid lines of the grid-like structure located on a corresponding PVDF block;

placing the base plate including the carbon nanowires back into the solution tank, pouring a new PVDF film-casting solution into the solution tank again, so that the new PVDF film-casting solution covers the carbon nanowires and the PVDF blocks; after placing the solution tank into the constant low-temperature environment to stand for the preset period, removing the solution tank and placing the solution tank on the evaporation table to allow the solution tank to stand at the room temperature in the range from 22° C. to 28° C. for a plurality of hours until the new film-casting solution solidifies on the base plate to form the PVDF nanowire composite thin film.

3. The pressure sensor of claim 2, wherein the two metal electrodes are formed by plating a chromium film in the polarized region on the two surfaces of the PVDF nanowire composite thin film, and sputtering a metal layer on the chromium film; two polarizing indenters are oriented toward the two metal electrodes to polarize the polarized region of the PVDF nanowire composite thin film between the two metal electrodes; and after polarization is completed, reverse low-voltage polarization is performed using two depolarizing indenters, i.e., each of the two depolarizing indenters is moved along a contour line of the corresponding metal electrode to achieve the reverse low-voltage polarization and accurately eliminate an edge halo, wherein a structure and a material of each of the two depolarizing indenters are the same as a structure and a material of each of the two polarizing indenters, a ratio of a diameter of each of the two polarizing indenters to a diameter D of each of the two metal electrodes ranges from 1.05 to 1.2, and a ratio of a diameter of each of the two depolarizing indenters to the diameter D of each of the two metal electrodes ranges from 0.1 to 0.2.

4. The pressure sensor of claim 3, wherein a piezoelectric coefficient $D_{33}$ of the polarized region of the PVDF nanowire composite thin film satisfies the following equation:

$$D_{33} = \begin{pmatrix} D_1 \\ D_2 \\ D_3 \end{pmatrix} = \frac{N}{\varepsilon_j} \begin{pmatrix} d_{11} & d_{12} & d_{13} & d_{14} & d_{15} & d_{16} \\ d_{21} & d_{22} & d_{23} & d_{24} & d_{25} & d_{26} \\ d_{31} & d_{32} & d_{33} & d_{34} & d_{35} & d_{36} \end{pmatrix} \begin{pmatrix} T_1 \\ T_2 \\ T_3 \\ T_4 \\ T_5 \\ T_6 \end{pmatrix};$$

where $D_i$ denotes an electric displacement generated in a direction i, and i takes the value of an integer from 1 to 3; $T_j$ denotes stress received by a force in a direction j, and j takes the value of an integer from 1 to 6; $d_{ij}$ denotes the piezoelectric coefficient, i denotes a direction of charge generation, and j denotes a direction of the force; N denotes a target value in a hypergravity environment, which is a dimensionless parameter; and $\varepsilon_j$ denotes an adjustment coefficient for the direction of charge generation, which is a dimensionless parameter.

5. The pressure sensor of claim 3, wherein:

the polarized PVDF nanowire composite thin film is cut, so that only the carbon nanowires are retained in edge portions of a rectangular ring of the PVDF nanowire composite thin film; a first electrode wire and a second electrode wire are led out from the two metal electrodes, respectively, the first electrode wire and the second electrode wire are led out from a wide side of the PVDF nanowire composite thin film; the carbon nanowires, in the edge portion of the wide side of the PVDF nanowire composite thin film from which the first electrode wire and the second electrode wire are led out, are removed; the double-layered flexible composite encapsulation layer is bonded; the carbon nanowires in the edge portion of each of the other three sides of the PVDF nanowire composite thin film are encapsulated in the flexible composite encapsulation layer; and after the carbon nanowires, in the edge portion of the wide side of the PVDF nanowire composite thin film from which the first electrode wire and the second electrode wire are led out, are removed, a longitudinal central axis of a remaining portion of the PVDF nanowire composite thin film overlaps with a longitudinal central axis of the flexible composite encapsulation layer, a width of the remaining portion of the PVDF nanowire composite thin film is denoted as $L_2$, a width of the flexible composite encapsulation layer is denoted as $L_3$, and the value of $L_2$ and the value of $L_3$ satisfy the following equations:

$$L_2 = k_2 \times D$$
$$L_3 = k_3 \times L_2,$$

wherein D denotes the diameter of the metal electrode, the value of $k_2$ is in a range from 2.15 to 4.65, and the value of $k_3$ is in a range from 1.02 to 1.05.

6. The pressure sensor of claim 1, wherein a method for preparing the flexible composite encapsulation layer includes:
preparing and disposing the lower PDMS layer on a bottom surface of the GeSbTe film, the GeSbTe film and the lower PDMS layer having a same thickness;
performing a plurality of indentation processes on a top surface of the GeSbTe film, so that a plurality of grooves arranged in a grid-like pattern are formed on the bottom surface of the lower PDMS layer; and after a period of time, allowing the bottom surface of the lower PDMS layer to rebound to a planar structure, and the GeSbTe film forms the double-layer structure of the flexible composite encapsulation layer; and
obtaining the flexible composite encapsulation layer by bonding a layer of the silicon nitride film on the top surface of the GeSbTe film and bonding a layer of the upper PDMS layer on a top surface of the silicon nitride film.

7. The pressure sensor of claim 1, wherein a distance between any two adjacent GeSbTe blocks of the upper layer GeSbTe film is $L_5$; a distance between any two adjacent GeSbTe blocks of the lower layer GeSbTe film is $L_4$; the value of $L_4$ and the value of $L_5$ satisfy the following equations, respectively:

$$L_4 = k_4 \times D$$
$$L_5 = k_5 \times L_4,$$

wherein D denotes a diameter of the metal electrode, the value of $k_4$ ranges from 0.721 to 0.956, and the value of k-ranges from 0.921 to 1.123.

8. The pressure sensor of claim 1, wherein two layers of metasurface media are fixed on two outer surfaces of the flexible composite encapsulation layer, respectively, the two layers of metasurface media are concentric with the polarized region of the PVDF nanowire composite thin film; each of the two layers of metasurface media completely covers the polarized region of the PVDF nanowire composite thin film and the two layers of metasurface media overlap with each other; and
a diameter of each of the two layers of metasurface media is $D_2$, a thickness of each of the two metasurface media is $M_5$, the value of $D_2$ and the value of $M_5$ satisfy the following equations, respectively:

$$D_2 = k_6 \times D$$
$$M_5 = k_7 \times M_4,$$

wherein, D denotes a diameter of the metal electrode, $M_4$ denotes a thickness of the PVDF nanowire composite thin film, the value of $k_6$ ranges from 1.45 to 1.67, and the value of k-ranges from 1.25 to 1.41.

9. The pressure sensor of claim 8, wherein when the pressure sensor is used in a discontinuous medium, each of the two layers of metasurface media is made of a hydrophilic material.

10. The pressure sensor of claim 8, wherein when the pressure sensor is used in a continuous medium, each of the two layers of metasurface media is made of a superhydrophobic material.

* * * * *